US005501725A

United States Patent [19]
Lauw et al.

[11] Patent Number: 5,501,725
[45] Date of Patent: Mar. 26, 1996

[54] METHOD FOR INCREASING THE STABILITY OF NON-IONIC SURFACTANT-CONTAINING INK COMPOSITIONS

[75] Inventors: Hiang Lauw, Corvallis; Garold Radke, Lebanon; Cheryl A. Macleod, Corvallis, all of Oreg.

[73] Assignee: Hewlett-Packard Company, Palo Alto, Calif.

[21] Appl. No.: 398,631

[22] Filed: Mar. 3, 1995

[51] Int. Cl.$^6$ ..................................... C09D 11/02
[52] U.S. Cl. ................... 106/20 A; 106/20 C; 106/22 B; 106/23 B
[58] Field of Search ............................. 106/20 A, 20 C, 106/23 B, 22 B

[56] References Cited

U.S. PATENT DOCUMENTS

| | | | |
|---|---|---|---|
| 4,500,895 | 2/1985 | Buck et al. | 346/140 R |
| 4,509,062 | 4/1985 | Low et al. | 346/140 R |
| 4,771,295 | 9/1988 | Baker et al. | 346/1.1 |
| 4,794,409 | 12/1988 | Cowger et al. | 346/140 R |
| 4,929,969 | 5/1990 | Morris | 346/140 R |
| 4,963,189 | 10/1990 | Hindagolla | 106/22 K |
| 5,198,023 | 3/1993 | Stoffel | 106/22 R |
| 5,340,388 | 8/1994 | Breton et al. | 106/22 B |

OTHER PUBLICATIONS

Hewlett–Packard Journal, vol. 39 (No. 4), Aug. 1988.
Product Information Sheet on TERGITOL® 15–5–5 by Union Carbide (undated).
Product Information Sheets on Polyurethane Foam by Foamex, L.P. (undated).
Product Information Sheet on GENAPOL® 26-L Surfactants by Hoechst Celanese Corp. (Oct. 1993).
Product Information Sheet on IGEPAL® CO Surfactants by Rhone–Poulenc (undated).
Product Information Sheet on NEODOL® Surfactants by Shell Chemical Company (undated).

*Primary Examiner*—Helene Klemanski

[57] ABSTRACT

A method for increasing the cloud point and stability of an ink. An ink is provided which includes a solvent, a coloring agent, and an ethoxylated non-ionic surfactant to increase print quality. To increase the cloud point of the ink (which is affected by the surfactant), the ink is placed in contact with a polymeric foam (e.g. polyurethane foam) which reacts with the surfactant to produce an ink product having a higher cloud point. The treated ink product is then removed from the foam. Treatment may be accomplished by passing the ink through the foam before placing the ink in an ink cartridge. Removal of the treated ink product from the foam may be achieved by compressing the foam. Alternatively, the ink may be placed within an ink cartridge containing the polymeric foam in which the ink will be treated in situ inside the cartridge.

19 Claims, No Drawings

METHOD FOR INCREASING THE STABILITY OF NON-IONIC SURFACTANT-CONTAINING INK COMPOSITIONS

BACKGROUND OF THE INVENTION

The present invention generally relates to a method for improving the stability of ink compositions, and more specifically to a process for increasing the stability and integrity of ink compositions containing non-ionic surfactants therein.

Substantial developments have been made in the field of electronic printing technology. A wide variety of highly efficient printing systems currently exist which are capable of dispensing ink in a rapid and accurate manner. Thermal inkjet systems are especially important in this regard. Printing systems using thermal inkjet technology basically involve a cartridge unit which includes at least one ink reservoir chamber in fluid communication with a substrate having a plurality of resistors thereon. Selective activation of the resistors causes thermal excitation of the ink and expulsion thereof from the ink cartridge. Thermal inkjet cartridge units currently in use contain either a single ink composition (e.g. black) or a plurality of different colored ink compositions, with each composition being retained in a separate compartment. Representative thermal inkjet systems are discussed in U.S. Pat. No. 4,500,895 to Buck et al., U.S. Pat. No. 4,794,409 to Cowger et al.; U.S. Pat. No. 4,509,062 to Low et al.; U.S. Pat. No. 4,929,969 to Morris; U.S. Pat. No. 4,771,295 to Baker et al.; and the *Hewlett-Packard Journal*, Vol. 39, No. 4 (August, 1988), all of which are incorporated herein by reference.

To obtain a maximum level of print quality using a thermal inkjet apparatus or other printing system, the ink composition being delivered must be carefully formulated. Specifically, the ink composition must be capable of producing a clear and distinct image with proper dispersion on the selected substrate (e.g. paper). Also, the ink composition must be able to produce an image which is characterized by an absence of mottling and the avoidance of color bleed in multi-color printing systems (e.g. the bleed of one color into another). The present invention involves the use of a particular group of surfactant compositions to achieve these goals. The selected surfactants are capable of improving the wettability and dispersion characteristics of the ink in which they are used. In addition, the surfactants discussed below are capable of controlling mottling and color bleed in multi-color printing systems.

However, the addition of surfactants to an ink composition can lower the cloud point of the composition and diminish its stability. The present invention involves a method for controlling (e.g. raising) the cloud point of an ink composition which contains the desired surfactant materials therein. The term "cloud point" as used herein (which directly relates to the stability and integrity of the ink composition) involves the temperature of the ink composition at which phase separation of the surfactant and solvent occurs (e.g. the temperature at which the surfactant is no longer soluble in the solvent). The cloud point temperature of an ink composition will limit the temperature range at which the composition can be used and stored. Once the cloud point temperature is reached, the ink will no longer contain a single set of properties and will instead consist of multiple phases with different characteristics. This condition results in an ink composition with a "cloudy" appearance. The use of an ink composition which has reached its cloud point temperature can result in a substantial deterioration in print quality. It is therefore desirable to formulate an ink composition with as high a cloud point as possible (e.g. preferably at least about 60° C.).

As described below, the present invention involves an ink composition containing specific surfactants which is treated in a unique manner to control (e.g. raise) the cloud point of the ink. Accordingly, a surfactant-containing ink can be formulated which is characterized by (1) a high cloud point; and (2) the avoidance of problems associated with mottling, color bleed, and the like. The present invention therefore represents an advance in the art of ink production technology as discussed below.

SUMMARY OF THE INVENTION

It is an object of the present invention to provide an ink composition which generates high-quality printed images with a substantial absence of mottling, color bleed, and similar problems.

It is another object of the invention to provide an ink composition which uses a special surfactant to avoid the problems listed above.

It is a further object of the invention to provide a method for controlling (e.g. raising) the cloud point of the surfactant-containing ink composition listed above so that phase separation within the ink may be avoided.

It is a still further object of the invention to provide a method for accomplishing the previously-described goals which is undertaken in a rapid and efficient manner.

It is an even further object of the invention to provide a method for achieving the goals listed above which involves a minimal number of process steps, production materials, and equipment.

As discussed below, a method for producing an ink composition is disclosed which (1) uses a specialized group of surfactant materials to substantially improve print quality; and (2) treats the ink composition in a highly effective manner to increase the cloud point and stability of the composition. These goals are achieved in an efficient manner using a minimal number of process steps and materials.

In accordance with the invention, an ink composition is provided which comprises at least one solvent, at least one coloring agent, and at least one ethoxylated non-ionic surfactant therein. The term "ethoxylated non-ionic surfactant" as used herein involves a particular group of uncharged surfactant materials which are highly efficient in improving the wettability and dispersion characteristics of ink compositions, as well as controlling problems associated with mottling, color bleed, and the like. Further information regarding the chemical characteristics of ethoxylated non-ionic surfactants, as well as specific examples of these materials will be provided below. In a preferred embodiment, the ink composition will contain about 0.1–30% by weight solvent, about 2–7% by weight coloring agent, and about 0.1–10% by weight ethoxylated non-ionic surfactant therein. While the use of ethoxylated non-ionic surfactants will provide numerous benefits as described above, they will typically produce an ink composition with a relatively low cloud point (e.g. a "first cloud point") which is normally about 30°–50° C.). As previously discussed, the use of an ink composition with a low cloud point can result in diminished print quality and other problems caused by phase separations within the ink.

To raise the cloud point of the surfactant-containing ink composition of the present invention, the composition is placed in contact with and absorbed into a portion of multicellular polymeric foam. The polymeric foam is of a type which will react with the ethoxylated non-ionic surfactant to produce a treated ink product within the foam having a second cloud point that is considerably greater (e.g.

higher) than the first cloud point (e.g. a second cloud point of at least about 60° C.). Specifically, contact between the ink composition and the polymeric foam will cause a conversion of the ink composition within the foam to create the treated ink product having the cloud point characteristics listed above. The conversion process will be discussed in more detail below. A variety of different polymeric foam materials may be used for treatment purposes, with the present invention not being limited to any particular composition for this purpose. In a preferred embodiment, polyurethane foam will be used. After the conversion process is completed, the treated ink product is extracted from the foam and used for printing in a selected printing unit (e.g. a thermal inkjet system or other printing apparatus).

Treatment as described above may be accomplished by passing the ink through a selected portion of foam prior to placing the ink in an ink cartridge. Removal (e.g. extraction) of the treated ink product from the foam may be achieved by compressing the foam to expel the ink product therefrom. Alternatively, the initial step of placing the ink composition in contact with a selected polymeric foam may be undertaken by delivering the ink composition into an ink cartridge containing a polymeric foam member therein which also functions as an ink reservoir. In this manner, the ink composition will be treated in situ within the cartridge prior to and during delivery.

The present invention represents an advance in the art of printing technology, and produces a completed ink product which is characterized by a high level of print quality and avoidance of the problems listed above. These and other objects, features, and advantages of the invention shall be described below in the following Detailed Description of Preferred Embodiments.

DETAILED DESCRIPTION OF PREFERRED EMBODIMENTS

The present invention involves a method for producing an ink composition which is characterized by a high degree of print quality and the avoidance of problems associated with ink phase separation, mottling, color bleed, and the like. These benefits are achieved by the addition of a special surfactant to the ink composition in combination with a process for increasing the cloud point of the ink to avoid phase separation problems. In this regard, the present invention involves an efficient processing system which achieves the foregoing benefits in a highly effective manner. While the present invention shall be described herein with reference to thermal inkjet technology, the claimed ink composition and processes associated therewith are likewise applicable to a wide variety of other printing systems. Furthermore, the materials and procedures discussed below shall be suitable for use in connection with single color (e.g. black) printing systems, as well as multi-color systems involving a plurality of different ink materials.

A. The Ink Composition

In accordance with the present invention, an ink composition is provided which is formulated to include a plurality of specific ingredients, with each ingredient performing a designated function. The ink composition (after treatment as described below) is especially suitable for use in a thermal inkjet printing cartridge of the type described above in U.S. Pat. No. 4,500,895 to Buck et al.; U.S. Pat. No. 4,794,409 to Cowger et al.; U.S. Pat. No. 4,929,969 to Morris; and U.S. Pat. No. 4,771,295 to Baker et al., as well as those sold by the Hewlett-Packard Company of Palo Alto, Calif. (USA) [part nos. 51626A, 51608A, 51639A, 51639C, 51639M, 51639Y, and 51633A]. The first ingredient to be employed in the ink composition is at least one solvent (or combination of multiple solvents). A wide variety of different solvents may be used in the ink composition, with the present invention not being limited exclusively to any particular solvent materials. Exemplary solvent compositions suitable for use herein are listed in U.S. Pat. No. 4,963,189 to Hindagolla which is incorporated herein by reference. For example, exemplary solvents include ethylene glycol, diethylene glycol, triethylene glycol, 1,5-pentanediol, 2-pyrrolidone, 2-(2-butoxyethoxy) ethanol and/or combinations thereof. Other solvent materials suitable for use in the ink composition include but are not limited to tetraethylene glycol, propylene glycol, polyethylene glycol, butanediol, hexanediol, propylene glycol laurate, mono and di-glycol ethers (e.g. cellusolves), monobutyl ether, carbitols, propylene glycol ether, dipropylene glycol ether, triethylene glycol ether, butyl alcohol, pentyl alcohol, c-butyrolactone, N-pyrrolidone, 2-pyrrolidone, N-(2-hydroxyethyl) pyrrolidone, and mixtures thereof. These materials are commercially available from a wide variety of sources including but not limited to the Aldrich Chemical Company of St. Louis, Mo. (USA).

In a preferred embodiment, the ink composition will contain about 0.1–30% by weight total solvent therein (whether a single solvent or combined solvents are employed). However, these values (as well as other numerical parameters expressed herein) may be varied in accordance with preliminary pilot studies involving the particular materials being used and the desired application for the completed ink formulation.

The ink composition will also include at least one coloring agent. Again, the present invention shall not be limited to any particular coloring agents or mixtures thereof. In a preferred embodiment, the term "coloring agent" as used herein shall encompass a wide variety of different dye materials and colors (including black). Exemplary dye materials suitable for use in the present invention are listed in U.S. Pat. No. 4,963,189 to Hindagolla which is again incorporated herein by reference. Such materials are black and involve the following basic structure:

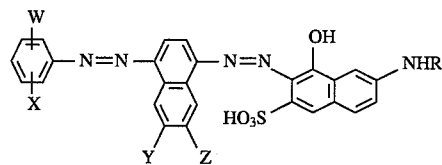

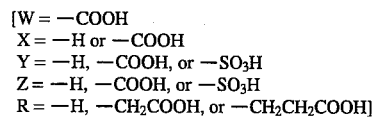

Specific and exemplary dye structures are provided in Table I below:

TABLE I

| Dye # | X | W | Y | Z | R |
|---|---|---|---|---|---|
| 1 | 3-COOH | 5-COOH | H | H | H |
| 2 | 3-COOH | 5-COOH | COOH | H | H |
| 3 | 3-COOH | 5-COOH | H | COOH | H |
| 4 | 3-COOH | 5-COOH | H | SO$_3$H | H |
| 5 | 3-COOH | 5-COOH | SO$_3$H | H | H |
| 6 | H | 4-COOH | H | COOH | H |
| 7 | 3-COOH | 4-COOH | H | H | CH$_2$COOH |
| 8 | 2-COOH | 5-COOH | H | SO$_3$H | CH$_2$COOH |
| 9 | 3-COOH | 5-COOH | SO$_3$H | H | CH$_2$COOH |
| 10 | 3-COOH | 5-COOH | H | H | CH$_2$CH$_2$COOH |
| 11 | 3-COOH | 5-COOH | H | COOH | CH$_2$COOH |

Additional dye materials suitable for use in the present invention are described in the Color Index, Vol. 4, 3rd ed., published by The Society of Dyers and Colourists, Yorkshire, England (1971), which is incorporated herein by reference and is a standard reference that is well known in the art. Exemplary dye materials listed in the *Color Index*, supra, which are suitable for use in the present invention include but are not limited to the following compositions: C.I. Direct Yellow 11, C.I. Direct Yellow 86, C.I. Direct Yellow 132, C.I. Direct Yellow 142, C.I. Direct Red 9, C.I. Direct Red 24, C.I. Direct Red 227, C.I. Direct Red 239, C.I. Direct Blue 9, C.I. Direct Blue 86, C.I. Direct Blue 189, C.I. Direct Blue 199, C.I. Direct Black 19, C.I. Direct Black 22, C.I. Direct Black 51, C.I. Direct Black 163, C.I. Direct Black 169, C.I. Acid Yellow 3, C.I. Acid Yellow 17, C.I. Acid Yellow 23, C.I. Acid Yellow 73, C.I. Acid Red 18, C.I. Acid Red 33, C.I. Acid Red 52, C.I. Acid Red 289, C.I. Acid Blue 9, C.I. Acid Blue 61:1, C.I. Acid Blue 72, C.I. Acid Black 1, C.I. Acid Black 2, C.I. Acid Black 194, C.I. Reactive Yellow 58, C.I. Reactive Yellow 162, C.I. Reactive Yellow 163, C.I. Reactive Red 21, C.I. Reactive Red 159, C.I. Reactive Red 180, C.I. Reactive Blue 79, C.I. Reactive Blue 216, C.I. Reactive Blue 227, C.I. Reactive Black 5, C.I. Reactive Black 31, C.I. Basic Yellow 13, C.I. Basic Yellow 60, C.I. Basic Yellow 82, C.I. Basic Blue 124, C.I. Basic Blue 140, C.I. Basic Blue 154, C.I. Basic Red 14, C.I. Basic Red 46, C.I. Basic Red 51, C.I. Basic Black 11, and mixtures thereof. These materials are known in the art and commercially available from a variety of sources. Exemplary sources for dye materials of the type described above which may be used in the present invention include but are not limited to the Sandoz Corporation of East Hanover, N.J. (USA), Ciba-Geigy of Ardsley, N.Y. (USA) and others.

It should also be noted that the term "coloring agent" as used herein shall further encompass pigment dispersion materials known in the art which basically involve a water insoluble colorant (e.g. a pigment) which is rendered soluble through association with a dispersant (e.g. an acrylic dispersant). Specific pigments which may be used to produce pigment dispersion materials are known in the art, and the present invention shall not be limited to any particular chemical compositions in this regard. Examples of such pigments include but are not limited to the following compositions which are listed in the *Color Index*, supra: C.I. Pigment Black 7, C.I. Pigment Blue 15, C.I. Pigment Red 2, and C.I. Disperse Red 17. As noted above, dispersant materials suitable for combination with the foregoing pigments will include acrylic monomers and polymers known in the art. An exemplary commercial dispersant involves a product sold by W. R. Grace and Co. of Lexington, Mass. (USA) under the trademark DAXAD 30—30. However, as previously indicated, the present invention shall not be limited to the dyes and/or pigment dispersion materials listed above. Other chemically comparable materials may be used which are determined by reasonable investigation to be suitable for the purposes set forth herein. In a preferred embodiment, the ink composition of the present invention will include about 2–7% by weight total coloring agent therein (e.g. whether a single coloring agent or combined coloring agents are used).

Next, the ink composition may include a number of optional ingredients in varying amounts. For example, an optional biocide may be added in order to prevent any microbial growth in the final ink product. Exemplary biocides suitable for this purpose would include proprietary products sold under the trademarks PROXEL GXL by Imperial Chemical Industries of Manchester, England; UCARCID 250 by Union Carbide of Danbury, Conn. (USA); and NUOSEPT 95 by Huls America, Inc. of Piscataway, N.J. (USA). In a preferred embodiment, if a biocide is used, the final ink product will include about 0.05–0.5% by weight biocide, with about 0.30% by weight being preferred.

Another optional ingredient to be used in the ink composition will involve one or more buffering agents. The use of a selected buffering agent or multiple (combined) buffering agents is designed to stabilize the pH of the ink composition. In a preferred embodiment, the desired pH of the ink composition will range from about 4–9. Exemplary buffering agents suitable for this purpose will include sodium borate, boric acid, and phosphate buffering materials known in the art for pH control. The selection of any particular buffering agents and the amount of buffering agents to be used (as well as the decision to use buffering agents in general) will be determined in accordance with preliminary pilot studies on the particular ink composition of concern.

A still further optional ingredient which may be used in the ink composition is an auxiliary bleed control agent. This material is especially appropriate for use in multi-color printing systems. Exemplary bleed control agents suitable for this purpose will involve magnesium nitrate, calcium nitrate, or mixtures of both. In a preferred embodiment, the ink composition will include about 3–6% by weight total auxiliary bleed control agent therein. However, the selection of any given bleed control agent, the exact amount of bleed control agent to be used, and the general need for a bleed control agent may be determined in accordance with preliminary investigations involving the other components chosen for use in the ink composition.

Finally, in addition to the components listed above, a key ingredient in the ink composition of the present invention involves a selected surfactant material. The use of a surfactant in the claimed ink composition provides numerous benefits including solubility control, the avoidance of ink mottling, improvement in the wettability and dispersion characteristics of the ink, and the reduction/avoidance of bleed problems in multicolor printing systems. To accomplish these goals in the most effective manner, the present invention involves the use of a particular surfactant material, namely, at least one ethoxylated non-ionic surfactant. The term "ethoxylated non-ionic surfactant" as used herein shall encompass a surfactant composition which is characterized by the absence of a charge, as well as the presence of one or more ethylene oxide groups thereon. These materials are particularly effective in achieving the goals listed above. For this reason, they are preferred over other surfactant compositions in the present invention. The presence of one or more ethylene oxide groups as described above contributes substantially to achieving the foregoing benefits. Likewise, the non-ionic character of the surfactants provides many advantages including the avoidance of undesired precipitation reactions within the ink composition which may occur when traditional ionic surfactants are employed.

A variety of different ethoxylated non-ionic surfactants may be used in the claimed ink composition, with the present invention not being limited to any particular ethoxylated non-ionic surfactants. An exemplary ethoxylated non-ionic surfactant suitable for use in the present invention shall include but not be limited to a material sold under the name TERGITOL®15-S-5 (CAS# 68131-40-8) by Union Carbide of Houston, Tex. (USA). This material is available in the form of a clear liquid. It generally involves a combination of multiple linear secondary alcohols which are chemically reacted with ethylene oxide. Furthermore, it has the following basic structural formula:

$C_{11-15}H_{23-31}O[CH_2CH_2O]_xH$

The foregoing composition has a T-shaped configuration and is characterized by a high degree of chemical stability in varying environmental conditions.

Another representative ethoxylated non-ionic surfactant is commercially available from the Hoechst Celanese Corporation of Charlotte, N.C. (USA) under the name GENAPOL®26-L. This material consists of a $C_{12}$–$C_{16}$ alcohol ethoxylate, and has the following basic structure:

$RO(CH_2CH_2O)_nH$

[wherein R=$C_{12}$–$C_{16}$ oleochemical; and n=1–11.5]

Further representative ethoxylated non-ionic surfactants are commercially available from the Rhone-Poulenc Company of Cranbury, N.J. (USA) under the name IGEPAL® CO. These materials are all produced from nonylphenol and are available in both liquid and solid (e.g. wax-like) form. For example, the following specific ethoxylated non-ionic surfactants are available under the IGEPAL® CO brand (listed by product number followed by the percentage of ethylene oxide therein):
CO-210 (23%), CO-430 (44%), CO-520 (50%), CO-530 (54%),
CO-610 (60%), CO-620 (63%), CO-630 (65%), CO-660 (66%),
CO-710 (68%), CO-720 (71%), CO-730 (75%), CO-850 (80%),
CO-880 (86%), CO-887 (86%), CO-890 (89%), CO-897 (89%),
CO-970 (91%), CO-977 (91%), CO-987 (93%), and CO-997 (95%). These surfactants are listed under CAS# 9016-45-9.

Additional representative ethoxylated non-ionic surfactants are commercially available from the Shell Chemical Company of Houston, Tex. (USA) under the name NEODOL®.

Other ethoxylated non-ionic surfactants may be used in the present invention, with the selection of any given surfactant being determined in accordance with preliminary pilot studies on the ink composition being formulated. In a preferred embodiment, the ink composition will include about 0.1–10% by weight total ethoxylated non-ionic surfactant (e.g. one of the surfactants listed above, mixtures of the foregoing surfactants, or other ethoxylated non-ionic surfactants used alone or in combination). To achieve optimal results, liquid forms of the selected ethoxylated non-ionic surfactant will be used.

Finally, to produce a given volume of the ink composition having the foregoing parameters, the remainder of the composition will preferably consist of water.

In summary, an exemplary ink composition suitable for use in the present invention is described below in Table II:

TABLE II

| Component | Wt. % |
|---|---|
| Solvent (1,5 pentanediol or diethylene glycol) | 15.0 |
| Coloring Agent (C.I. Acid Blue 9, C.I. Acid Red 52, or C.I. Acid Yellow 23 | 5.0 |
| Ethoxylated non-ionic surfactant (e.g. TERGITOL ® 15-S-5) | 3.0 |
| Biocide (e.g. PROXEL GXL) | 0.5 |
| Auxiliary bleed control agent (magnesium nitrate) | 4.0 |
| Water | 72.5 |
| | 100.0 |

However, the present invention shall not be limited to the foregoing example, and may involve other ink compositions incorporating the ingredients listed above in various combinations.

B. Treatment of the Ink Composition to achieve a Higher Cloud Point and Increased Stability As stated above, the use of ethoxylated non-ionic surfactants provides numerous benefits ranging from solubility control to improving the wettability and dispersion characteristics of the ink composition. However, the addition of an ethoxylated non-ionic surfactant will typically produce an ink composition having a relatively low cloud point. The term "cloud point" as used herein (which directly relates to the stability and integrity of the ink composition) involves the temperature of the ink composition at which a phase separation of the surfactant and solvent occurs (e.g. the temperature at which the surfactant is no longer soluble in the solvent). In particular, the cloud point temperature of an ink composition will limit the temperature range at which the composition can be used and stored. At the cloud point temperature of an ink composition, the ink will no longer contain a single set of properties and will instead consist of multiple phases with different characteristics. This condition results in an ink composition with a "cloudy" appearance. The use of an ink composition which has reached its cloud point temperature can result in a substantial deterioration in print quality. It is therefore desirable to formulate an ink composition with as high a cloud point as possible (e.g. preferably at least about 60° C.).

In the ink composition of the present invention, the composition will typically have a cloud point (hereinafter a "first cloud point") of about 30°–50° C. Notwithstanding the benefits provided by the ethoxylated non-ionic surfactant, it is also a goal of the present invention to raise the cloud point of the ink composition to a more acceptable level (e.g. at least about 60° C.). As a result, the ink composition will be less temperature sensitive, thereby avoiding phase separations and improving stability.

In accordance with the present invention, a treatment process is provided which will substantially increase the cloud point of the ink composition. To accomplish this goal, the ink composition is placed in contact with a portion of multicellular polymeric foam having specific chemical characteristics designed to raise the cloud point (e.g. the first cloud point) of the ink composition. The selected polymeric foam will be of a type which is capable of reacting with the ethoxylated non-ionic surfactant in the ink composition to produce a treated ink product having a second cloud point which is greater (e.g. higher) than the first cloud point associated with the untreated ink composition. In a preferred embodiment as discussed below, an exemplary and preferred foam material suitable for this purpose will involve polyurethane foam.

Contact between the ink composition and the polymeric foam will cause the ink composition to be absorbed by capillary action into the foam. Within the foam, the claimed ink composition (typically having a first cloud point of about 30°–50° C.) will be converted into a treated ink product having a greater cloud point (e.g. a second cloud point of at least about 60° C.).

As previously stated, it is preferred that the polymeric foam material used to treat the ink composition involve polyurethane foam polyurethane foam suitable for use in the present invention is commercially available from a wide variety of sources including but not limited to Foamex, LP of Eddystone, Pa. (USA) under the product name SIF®, as well as a material sold under the designation "FPLD" by Foamex. Polyurethane foam sold by Foamex under the FPLD designation actually consists of multicellular polyurethane foam which has been compressed to achieve a size reduction of between about 2.5–5.5 times so that a greater density and number of cells will be present in a given amount of foam. Polyurethane foam products are also available from the Scott Paper Company of Philadelphia, Pa. (USA). In a preferred embodiment, the selected polyurethane foam will have a porosity level of about 60–450 pores/cells per inch, with a porosity level at the higher end of this range being preferred and present in compressed foam products as described above. While polyurethane foam is preferred for use as the polymeric foam composition in the present invention, other polymeric foams with comparable chemical and physical characteristics shall be deemed equivalent and suitable for use in the foregoing process. Accordingly, the invention shall not be exclusively limited to the use of polyurethane foam as described above.

From a chemical standpoint, the reactions which take place between the polymeric foam (e.g. polyurethane foam) and the ethoxylated non-ionic surfactant to produce the treated ink product are not entirely understood. It is contemplated that ethoxylated non-ionic surfactants of the type described herein contain mixtures of surface-active molecules with varying head and tail group sizes. This factor causes a wide distribution of solubilities in the ink composition, with substantial quantities of low solubility components causing a decrease in cloud point. Removing the least soluble surface-active molecules will correspondingly increase the cloud point of the ink composition. It is further contemplated that by contacting the ink composition with the selected polymeric foam (e.g. polyurethane foam), the least soluble surface-active molecules in the surfactant are somehow adsorbed onto the foam and removed from the ink. This process is facilitated by the particular chemical/physical characteristics of the polymeric materials in the foam. Accordingly, a treated ink product is produced which has a second cloud point that is greater than the first cloud point associated with the untreated ink composition. The resulting increase in cloud point will increase the stability of the ink product and avoid undesired phase separations within the ink. Finally, it should be emphasized that the foregoing treatment process does not diminish the overall effectiveness and benefits provided by the ethoxylated non-ionic surfactant within the ink composition, and does not destroy the surfactant.

Contacting of the ink composition with the selected polymeric foam (e.g. polyurethane foam) may be accomplished by applying the ink directly to the foam (using a tubular conduit or other conventional delivery device). Alternatively, the portion of polymeric foam may be partially or entirely immersed within the ink composition. In either case, the ink composition will be absorbed into the foam by capillary action. The treatment reaction inside the foam will occur in a substantially instantaneous manner, thereby requiring the ink composition to be maintained within the foam for only a minimal amount of time (e.g. not more than about 5 seconds). The treated ink product is then extracted from the foam and used in a selected printing system (e.g. a thermal inkjet printer and the like). In a preferred embodiment, extraction of the treated ink product from the foam may be undertaken by compressing the foam to expel the ink product therefrom. Alternatively, the ink product may be removed by applying suction to the foam using conventional vacuum devices. In this regard, the present invention shall not be limited to any particular method for removing the ink product from the foam. Furthermore, the foregoing treatment process is designed to be undertaken outside of any thermal inkjet or other printing cartridge. The portion of foam as described above is therefore maintained outside of and separate from any printing cartridge units during the treatment process, with the treated ink product being removed from the foam and thereafter supplied to a selected cartridge unit or printing system.

Finally, in an alternative embodiment, the initial step of placing the ink composition in contact with the polymeric foam may be undertaken by delivering the ink composition into an ink cartridge containing a polymeric foam member therein of the same type described above (which also functions as an ink reservoir in the cartridge). In this embodiment, the foam member in the ink cartridge will be supplied with the ink composition by applying the ink directly to the foam member, with the composition being absorbed therein. As a result, the ink composition will be treated in situ within the cartridge to produce the treated ink product which may then be immediately delivered to a selected substrate (e.g. paper). Exemplary ink cartridge units which may be used for this purpose include those described in U.S. Pat. No. 4,771,295 to Baker et al. and sold by the Hewlett-Packard Company of Palo Alto, Calif. (USA) [part nos. 51626A, 51608A, 51639A, 51639C, 51639M, 51639Y, and 51633A].

The present invention offers numerous benefits as described above. Specifically, it allows the use of an ethoxylated non-ionic surfactant (which provides significant advantages as previously discussed) while maintaining the cloud point of the ink at a high level so that phase separations are avoided. As a result, an ink composition is produced which is characterized by high print quality when delivered using a selected printing system. Accordingly, the present invention represents an advance in the art of ink printing technology. Having herein described preferred embodiments of the invention, it is anticipated that suitable modifications may be made thereto by individuals skilled in the art which nonetheless remain within the scope of the invention. For example, the present invention shall not be limited regarding the particular coloring agents and solvents to be used in the ink composition, as well as the method which is selected for placing the ink in contact with the polymeric foam. Accordingly, the present invention shall only be construed in connection with the following claims:

The invention that is claimed is:

1. A method for increasing the cloud point and stability of an ink composition comprising the steps of:

providing an ink composition comprising at least one solvent, at least one coloring agent, and at least one ethoxylated non-ionic surfactant therein, said ink composition having a first cloud point;

placing said ink composition in contact with a portion of multicellular polymeric foam which will react with said ethoxylated non-ionic surfactant in said ink composition to produce a treated ink product having a second cloud point which is greater than said first cloud point, said ink composition being absorbed into said foam and converted into said treated ink product therein; and extracting said treated ink product from said multicellular polymeric foam, said second cloud point of said treated ink product being greater than said first cloud point.

2. The method of claim 1 wherein said first cloud point is about 30°–50° C.

3. The method of claim 2 wherein said second cloud point is at least about 60° C.

4. The method of claim 1 wherein said ink composition comprises about 0.1–30% by weight said solvent.

5. The method of claim 1 wherein said ink composition comprises about 2–7% by weight said coloring agent.

6. The method of claim 1 wherein said ink composition comprises about 0.1–10% by weight said ethoxylated non-ionic surfactant.

7. A method for increasing the cloud point and stability of an ink composition comprising the steps of:

providing an ink composition comprising at least one solvent, at least one coloring agent, and at least one ethoxylated non-ionic surfactant therein, said ink composition having a first cloud point;

placing said ink composition in contact with a portion of multicellular polymeric foam which will react with said ethoxylated non-ionic surfactant in said ink composition to produce a treated ink product having a second cloud point which is greater than said first cloud point, said ink composition being absorbed into said foam and converted into said treated ink product therein; and compressing said multicellular polymeric foam in order to expel said treated ink product therefrom, said second cloud point of said treated ink product being greater than said first cloud point.

8. The method of claim 7 wherein said ink composition comprises about 0.1–10% by weight said ethoxylated non-ionic surfactant.

9. A method for increasing the cloud point and stability of an ink composition comprising the steps of:

providing an ink composition comprising about 0.1–30% by weight of at least one solvent, about 2–7% by weight of at least one coloring agent, and about 0.1–10% by weight of at least one ethoxylated non-ionic surfactant therein, said ink composition having a first cloud point of about 30°–50° C.;

placing said ink composition in contact with a portion of multicellular polymeric foam which will react with said ethoxylated non-ionic surfactant in said ink composition to produce a treated ink product having a second cloud point of at least about 60° C., said ink composition being absorbed into said foam and converted into said treated ink product therein; and extracting said treated ink product from said multicellular polymeric foam, said second cloud point of said treated ink product being at least about 60° C.

10. The method of claim 9 wherein said extracting of said treated ink product from said multicellular polymeric foam comprises the step of compressing said multicellular polymeric foam in order to expel said treated ink product therefrom.

11. A method for increasing the cloud point and stability of an ink composition comprising the steps of:

providing an ink composition comprising at least one solvent, at least one coloring agent, and at least one ethoxylated non-ionic surfactant therein, said ink composition having a first cloud point;

placing said ink composition in contact with a portion of polyurethane foam so that said ink composition is absorbed into said polyurethane foam, said polyurethane foam reacting with said ethoxylated non-ionic surfactant in said ink composition to produce a treated ink product within said polyurethane foam having a second cloud point which is greater than said first cloud point; and extracting said treated ink product from said polyurethane foam, said second cloud point of said treated ink product being greater than said first cloud point.

12. The method of claim 11 wherein said first cloud point is about 30°–50° C.

13. The method of claim 12 wherein said second cloud point is at least about 60° C.

14. The method of claim 11 wherein said ink composition comprises about 0.1–30% by weight said solvent.

15. The method of claim 11 wherein said ink composition comprises about 2–7% by weight said coloring agent.

16. The method of claim 11 wherein said ink composition comprises about 0.1–10% by weight said ethoxylated non-ionic surfactant.

17. A method for increasing the cloud point and stability of an ink composition comprising the steps of:

providing an ink composition comprising at least one solvent, at least one coloring agent, and at least one ethoxylated non-ionic surfactant therein, said ink composition having a first cloud point;

placing said ink composition in contact with a portion of polyurethane foam so that said ink composition is absorbed into said polyurethane foam, said polyurethane foam reacting with said ethoxylated non-ionic surfactant in said ink composition to produce a treated ink product within said polyurethane foam having a second cloud point which is greater than said first cloud point; and compressing said polyurethane foam in order to expel said treated ink product therefrom, said second cloud point of said treated ink product being greater than said first cloud point.

18. The method of claim 17 wherein said ink composition comprises about 0.1–10% by weight said ethoxylated non-ionic surfactant.

19. A method for increasing the cloud point and stability of an ink composition comprising the steps of:

providing an ink composition comprising about 0.1–30% by weight of at least one solvent, about 2–7% by weight of at least one coloring agent, and about 0.1–10% by weight of at least one ethoxylated non-ionic surfactant therein, said ink composition having a first cloud point of about 30°–50° C.;

placing said ink composition in contact with a portion of polyurethane foam so that said ink composition is absorbed into said polyurethane foam, said polyurethane foam reacting with said ethoxylated non-ionic surfactant in said ink composition to produce a treated ink product within said polyurethane foam having a second cloud point of at least about 60° C.; and extracting said treated ink product from said polyurethane foam, said second cloud point of said treated ink product being at least about 60° C.

* * * * *